United States Patent
Malle

(10) Patent No.: US 9,349,097 B2
(45) Date of Patent: May 24, 2016

(54) PROCESSOR FOR SITUATIONAL ANALYSIS

(75) Inventor: Jean-Pierre Malle, Saint Michel sur Orge (FR)

(73) Assignee: M8, Saint Michel sur Orge (FR)

( * ) Notice: Subject to any disclaimer, the term of this patent is extended or adjusted under 35 U.S.C. 154(b) by 531 days.

(21) Appl. No.: 13/809,564

(22) PCT Filed: Jul. 13, 2011

(86) PCT No.: PCT/EP2011/061910
§ 371 (c)(1),
(2), (4) Date: Mar. 27, 2013

(87) PCT Pub. No.: WO2012/007489
PCT Pub. Date: Jan. 19, 2012

(65) Prior Publication Data

US 2013/0179389 A1 Jul. 11, 2013

(30) Foreign Application Priority Data

Jul. 13, 2010 (FR) ...................................... 10 55703

(51) Int. Cl.
*G06N 5/04* (2006.01)
*G06F 17/30* (2006.01)
*G06N 5/02* (2006.01)

(52) U.S. Cl.
CPC ............ *G06N 5/04* (2013.01); *G06F 17/30592* (2013.01); *G06N 5/022* (2013.01)

(58) Field of Classification Search
None
See application file for complete search history.

(56) References Cited

U.S. PATENT DOCUMENTS

| 5,963,653 A | 10/1999 | McNary | |
| 2004/0243529 A1* | 12/2004 | Stoneman | 706/10 |

(Continued)

FOREIGN PATENT DOCUMENTS

| EP | 1855238 | 11/2007 |

OTHER PUBLICATIONS

Farenc, et al. "An informed environment dedicated to the simulation of virtual humans in urban context." Computer Graphics Forum. vol. 18. No. 3. Blackwell Publishers Ltd, 1999. 9 pages.*

(Continued)

*Primary Examiner* — Stanley K Hill
*Assistant Examiner* — Benjamin Buss
(74) *Attorney, Agent, or Firm* — Blakely Sokoloff Taylor & Zafman LLP

(57) ABSTRACT

The present invention relates to a data-processing device, characterized in that it includes, in combination: a memory (10) which is organized into two spaces, one containing attributes describing the stored data, and the other containing connectivity links among the stored data, and which is organized according to one or more dimensions respectively associated with attributes and divided into one or more hierarchized segments, the data being informed by creating, deleting, or modifying attribute values characterizing said segments; a means (11) for integrating one or more incoming information streams, which analyzes said streams in order to determine the data constituting same and to structure said data and the attributes thereof according to the organization of said memory (10); an inference engine (14) implementing, in parallel or in series, inference rules (141) grouped together in libraries (15), said rules (141) being programmed to regenerate a sequence including at least one segment of the memory, by creating, deleting, or modifying at least one datum and/or at least one attribute value and/or at least one connectivity link during the implementation thereof in the at least one space of the memory; a means (13) for allocating resources activating or deactivating the inference rules (141) on the basis of a priority rule; a means (12) for extracting data, which are identified by programming and/or by at least one selected attribute value and/or at least one selected connectivity link, and/or which are located in one or more selected segments of the memory (10), and providing same in one or more outgoing information streams. The present invention also relates to an information-processing system and to an associated computer program product.

10 Claims, 3 Drawing Sheets

(56) References Cited

U.S. PATENT DOCUMENTS

| | | | |
|---|---|---|---|
| 2005/0202845 A1* | 9/2005 | Sasaki | 455/556.2 |
| 2005/0257179 A1* | 11/2005 | Stauffer et al. | 716/3 |
| 2006/0002552 A1* | 1/2006 | LeComte et al. | 380/217 |
| 2007/0111172 A1* | 5/2007 | Kinard | 434/188 |
| 2007/0192271 A1* | 8/2007 | George et al. | 706/52 |
| 2007/0260470 A1* | 11/2007 | Bornhoevd et al. | 705/1 |
| 2008/0077368 A1* | 3/2008 | Nasle | 703/4 |
| 2009/0006289 A1* | 1/2009 | Jaros et al. | 706/12 |
| 2009/0150907 A1* | 6/2009 | Aharoni et al. | 719/318 |
| 2009/0254971 A1* | 10/2009 | Herz et al. | 726/1 |
| 2010/0088259 A1* | 4/2010 | Valpola et al. | 706/14 |
| 2010/0205541 A1* | 8/2010 | Rapaport et al. | 715/753 |
| 2010/0235803 A1* | 9/2010 | Gramark et al. | 716/12 |
| 2011/0119212 A1* | 5/2011 | De Bruin et al. | 706/12 |
| 2012/0137367 A1* | 5/2012 | Dupont et al. | 726/25 |

OTHER PUBLICATIONS

Jim Gray, et al.; "Data Cube: A Relational Aggregation Operator Generalizing Group-By, Cross-Tab, and Sub-Totals"; Journal of Data Mining and Knowledge Discovery, Norwell, MA, Jan. 1, 1997; pp. 29-53.

Ferdinando Campanile, et al.,; "Adaptable Parsing of Real-Time Data Streams", Parallel, Distributed and Network-Based Processing, 2007.Feb. 1, 2007, pp. 412-418.

Anonymous; "Oracle Database Data Warehousing Guide 10g Release 2, Passage", Oracle Database Data Warehousing Guide 10G Release, Dec. 31, 2005, pp. 20-1 thru 20-36.

* cited by examiner

PROCESSOR FOR SITUATIONAL ANALYSIS

GENERAL TECHNICAL FIELD

The present invention relates to a data-processing device conceived for the programming of expert systems or artificial intelligence systems simulating human reasoning by being able to implement reasoning by induction.

More precisely, it relates to a data-processing device dedicated in particular to statistical processings, to datamining, to the conception of decision aid tools, to diagnostics, to forecasting or approximation, to the conception of simulators, automatic learning or aid to learning systems and generally speaking the conception of situation analysis systems or situational analysis.

PRIOR ART

Computer processors have made it possible for more than 50 years to perform millions of calculations in always shorter times. With their power, they are more and more used as analysis and prediction tools.

However, the data-processing architecture implemented by processors has limitations and constraints. A processor takes in input sequences of bits, transforms them through series of logic gates, and deduces therefrom another sequence of bits in output. It is the series of logic gates that determines the calculation that the processor carries out. This series, predetermined in the program, depends on a model implemented by the user according to the rules of formal logic, and based on known situations. These models may take extremely varied forms, from quantitative models for market finance up to mechanical models for engineering. The general principle consists in analyzing real phenomena to forecast results from the application of one or more models at a given level of approximation.

Within the model, a processor proves to be effective, but remains on the one hand incapable of going beyond the limits of said model and also remains necessarily constrained by the limits inherent in the rules of the algorithmic logic. In addition, if the model has imperfections from the start, these will affect the quality of the results, or even the relevance of the model itself.

Another known approach has consisted in developing data-processing devices with architecture inspired by the physical structure of the human brain in the form of artificial neuron network. This type of architecture, the function of which is determined by the structure of the network, implements a learning process which makes it possible to acquire, to store and to use knowledge by using in particular the principle of induction by inference.

Different types of neuronal networks have been developed which have proved in some cases to be more efficient than conventional processor architectures especially in the processing of signals and items of information (telecommunications, finances, meteorology), processings of statistical nature (marketing), shape classification and recognition (imaging, character recognition).

These architectures produce however results that remain very dependent on the one hand on the structure of the network (the types of networks differ according to their topology, the aggregation functions and/or thresholding used) and on the other hand the learning model selected, which makes a phase of adjustment of the network necessary.

The present invention proposes an alternative data-processing device which, through the observation of situations, makes it possible to analyze data and to predict other situations, without being dependent on a model or on a physical or logical implementation structure.

"Situation" is here taken to mean more or less complex and more or less vague information describing an action or a particular state. The situation comes from an observation by a human being or a machine and may be as much real as imaginary.

DESCRIPTION OF THE INVENTION

The present invention proposes a data-processing device, its architecture being able to be physical or logical and forming a situational analysis processor.

To this end a data-processing device is proposed, characterized in that it comprises in combination:
  a memory organized
    on the one hand into two spaces, one containing attributes describing the stored data, and the other containing connexity links among the stored data,
    and on the other hand according to one or more dimensions respectively associated with attributes and divided into one or more hierarchized segments, the data being inputted by creating, deleting or modifying values of attributes characterizing these segments;
  means for integrating one or more incoming information streams that analyze said streams to determine the data constituting same and to structure said data and the attributes thereof according to the organization of said memory;
  an inference engine implementing, in parallel or in series, inference rules grouped together in libraries, said rules being programmed to regenerate a sequence including at least one segment of the memory, by creating, deleting or modifying at least one datum and/or at least one attribute value and/or at least one connexity link during the implementation thereof in the at least one space of the memory,
  means for allocating resources activating or deactivating the rules of inference on the basis of a priority rule,
  means for extracting data, identified by programming and/or by at least one selected attribute value and/or at least one selected connexity link; and/or located in one or more selected segments of the memory, and providing same in one or more outgoing information streams.

According to other advantageous and non-limiting characteristics of the invention:
  the memory is organized in at least three dimensions, of which at least one time dimension associating with the data one or more attributes making it possible to date the memorization of the data, an idiosyncratic dimension associating with the data one or more attributes making it possible to determine the relative specificity of the data, a conceptual dimension associating with the data one or more attributes making it possible to hierarchize the data according to levels of abstraction;
  the first space of the memory containing attributes of data is constituted of even levels identified as levels of situations, and the second space of the memory containing relations between data is constituted of uneven levels identified as levels of connexities;
  at least one inference rule implemented by the inference engine induces a connexity level of abstraction $2k+1$ from a situation level of abstraction $2k$ and/or a hyper-situation level of abstraction $2k+2$ from a connexity level of abstraction $2k+1$;
  the priority rule implemented by the means for allocating resources is a function of the hierarchy of the memory segments to be regenerated, predefined parameters of the inference rules and of the interval separating the activation occurrences of the inference rules;

the memory is connected to a mass storage space in which segments may be saved;

the means for extracting data select singular situations, situations having varied, and plausible projected situations.

This innovative device opens up great prospects in numerous economic fields using analysis, prediction and simulation tools. It is capable, in an autonomous manner, of receiving in input one or more situational streams, of extracting situations therefrom, of distinguishing the important elements and continuously applying thereto processings, detecting phenomena and predicting evolutions of solutions, particularly by induction.

The advantages are multiple: this device is not constrained by a model or an implementation architecture, and thus permanently adapts itself. It is capable, following the example of the human brain, of focusing on the essential by managing its resources. Finally, its possibilities appear much more universal than those of any current expert system, compartmentalized in a particular field.

The device according to the invention is asynchronous, non deterministic, and proves to be neither connectionist nor computationist since its power is both in its structure and its logic. It accepts sequential as parallel functioning.

The present invention proposes according to a second aspect a physical implementation of situational analysis processor, namely an information-processing system including at least one processing unit, at least one memory unit, a first interface with at least one incoming information stream and a second interface with at least one outgoing information stream, characterized in that it implements the architecture of the processing device according to the first aspect of the invention.

According to other advantageous and non-limiting characteristics of the invention:

said processing unit comprises at least one multi-core processor;

said processing unit implements a neuronal network structure.

The present invention proposes, according to a third aspect, a computer program product including program code instructions which, when they are executed, implement the architecture of the device according to the first aspect of the invention.

BRIEF DESCRIPTION OF DRAWINGS

Other characteristics and advantages of the present invention will become clear on reading the description that follows of a preferential embodiment. This description will be given with reference to the appended drawings, in which.

DETAILED DESCRIPTION OF A PREFERRED EMBODIMENT

As indicated above, the elementary unit in situational analysis is the situation. This may be more or less true (for "past" situations), more or less plausible (for "future" situations).

The situations are composed of information objects which are here named "situatrons". Each situatron is a datum that can be manipulated and may be present in one or more situations. It is described by a set of attributes, the "clues", which may be more or less precise or coherent. These attributes may evolve over time.

Thus, "Matthieu is drafting a patent application" is a situation. This situation may be described according to several points of view and according to different levels of detail. Thus, "The black mouse of the computer of Matthieu" also makes up a situation informing us on the general situation. In this situation, the black mouse, the computer, the patent application and Matthieu are situatrons.

At an even finer level of detail, the fact that the mouse is connected to the computer and the fact that Matthieu possesses this computer make up two particular situations from these same situatrons. The items of information contained in these situations may be encoded in the following manner:

OBJ(mouse001); situatron MOUSE

IDC(colour, mouse001, black); attribute COLOUR black

OBJ(computer001); situatron COMPUTER

SIT(connected, mouse001, computer001); situation MOUSE connected to the COMPUTER HUM(user001); situatron USER IDC(first name, user001, Matthieu); attribute FIRST NAME Matthieu SIT(use, computer001, user001); situation the USER Matthieu is using the COMPUTER.

In this example it has been selected in an arbitrary manner that the codes OBJ (Object) and HUM (Human) identify situatrons, while enabling the distinction between objects and persons. The code IDC (clue) makes it possible to associate an attribute with a situatron and the code SIT (Situation) to describe a situation composed from previously defined situatrons. The invention is nevertheless not limited to this syntax in particular, and those skilled in the art will know how to adapt it, particularly by introducing other codes, for example SPA (space) which would designate a place.

The situations may thus not be encoded in natural language in order to escape the ambiguities inherent in standard vocabularies. The syntax used to describe the situations is arbitrary but needs to be adapted to the computer tools. Advantageously, the language selected is a metalanguage, in particular the language XML (Extensible Markup Language).

The processing device 1 according to the invention is capable of working on the situations and the situatrons described in this form.

Figure 1:
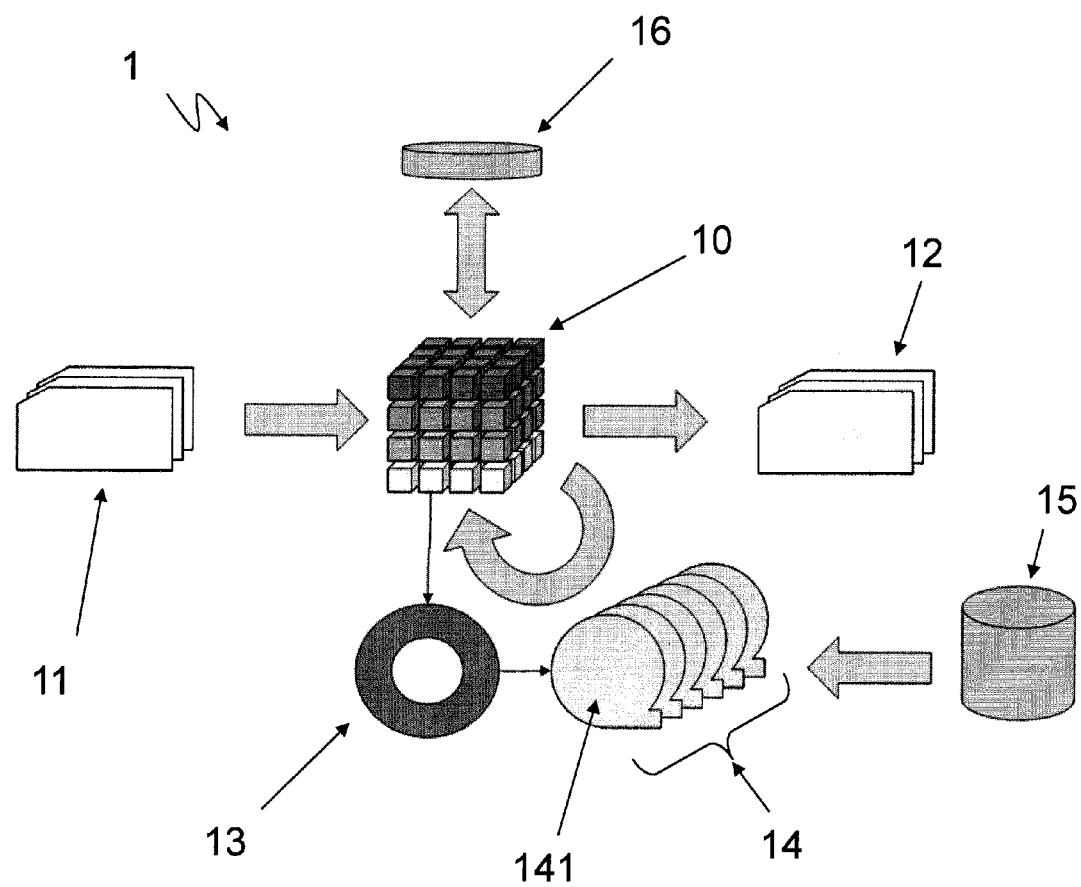
FIG. 1 is a diagram of an embodiment of a device according to the invention.

What follows is an advantageous description of an embodiment of this device 1, with reference to the diagram represented in FIG. 1. It comprises an organized memory 10, means 11 for integrating an incoming information stream, an inference engine 14, means 13 for allocating resources, means 12 for extracting data to an outgoing information stream.

Memory

The memory 10 is a situational memory, structured to conserve the data necessary for situational analysis. This memory 10 is organized into two spaces. The first space contains the attributes of the stored data, in other words directly of situations, situatrons, or groups of situations or situatrons. The second space contains connexity links among the stored data, in other words the connexity relations between the situations and situatrons of the first space.

The connexity links will be established from the moment that situatrons will be present in common situations, or share common clues. Thus, in the preceding example, the fact of being connected to a computer creates a connexity link between different mice.

This second space is a dual space of the first, in fact it is an induced functions space.

The situatrons, the attributes of a situatron and the connexity links are thus induced from the observation and thus created as the information is acquired or a non observed situations are induced, they may be deleted when they become obsolete, and they may be modified if they evolve or if they prove to be inexact. Their types are not predefined, and may be adapted to any circumstance.

Figure 2:
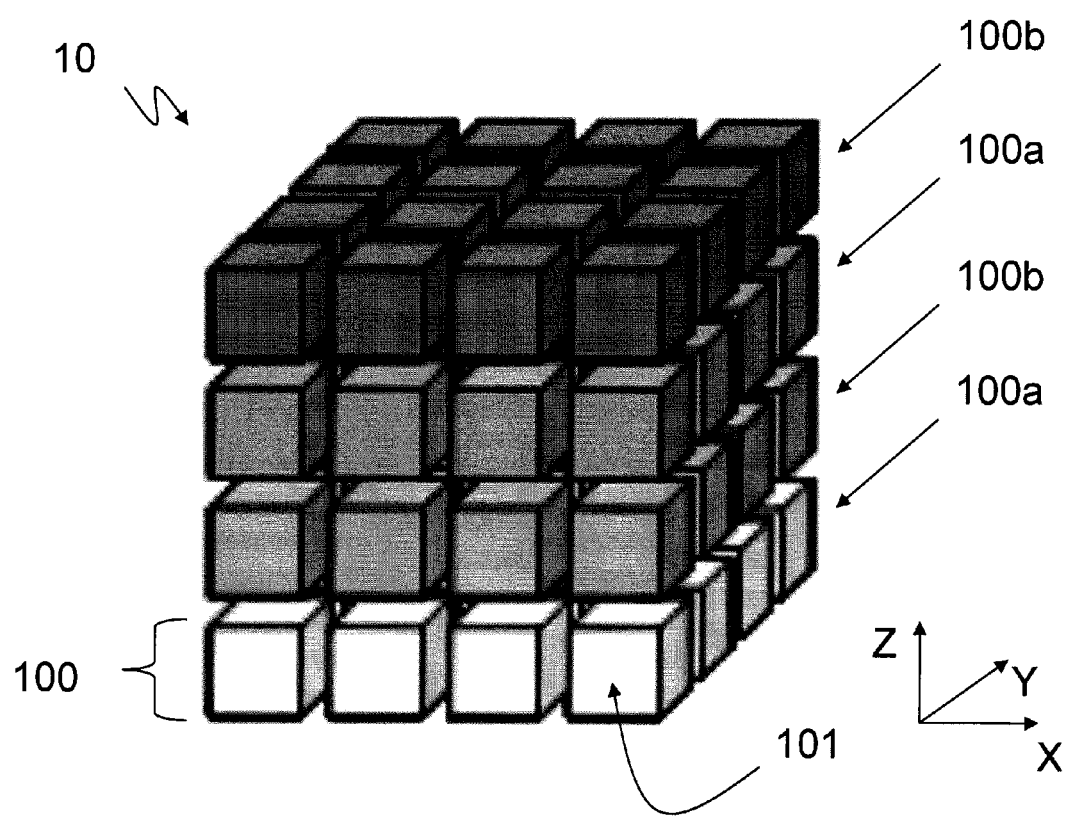
FIG. 2 is a diagram of an advantageous embodiment of a situational memory used by the invention.

The memory 10 possesses a specific organization, an example of which is represented in FIG. 2. This organization follows one or more dimensions, respectively associated with attributes, and is divided into one or more hierarchized segments. Each segment is characterized by one or more values of attribute or ranges of particular values of attributes. The data are inputted by creating, deleting or modifying the values of attributes characterizing these segments, which defined them a place in the memory 10.

In particular, these dimensions are three in number in the preferred embodiment. This leads to an organization in the form of an assembly of cubes 101, each cube being characterized by a unique combination of one segment per dimension.

The first dimension is a time dimension, and makes it possible to date the memorization of the data. The date of the memorization of the data (date of observation) remains separate from the date of the facts borne by the situation, the latter being able to be the object of one or more separate attributes, but without link with those of the time dimension. The segments of the time dimension correspond to periods. It extends on the X axis in FIG. 2.

Thus, for example, the items of information relating to the Battle of Marignan could be stored in the memory in the following manner:
OBS(30 Apr. 2010); date of the observation
SIT(win a victory, king001, event001, place001); combat situation
HUM(king001); actor situatron
IDC(name, king001 "François 1$^{sr}$"); clue associated with the situatron
EVT(event001); event situatron
IDC(title, event001, "Battle of Marignan"); clue associated with the situatron
IDC(date, event001, 1515); clue associated with the situatron
SPA(place001); place situatron
IDC(country, place001, "Italy"); clue associated with the situatron In this example it is possible to establish a time segmentation of the memory by defining the following periods:
Segment 1—Future=everything to come
Segment 2—Present=last 24 h
Segment 3—Recent past=3 preceding days
Segment 4—Intermediate past=in the last month
Segment 5—Distant past=remainder Then, on the date of the 7 May 2010, the situational scene on the Battle of Marignan, observed on the 30 Apr. 2010, will be found again in the segment 4.

If on the same day (7 May 2010) items of information on Marignan are introduced which make it clear that the Swiss were defeated at this battle on the 13 September, they could themselves be stored in the following manner:
OBS(7 May 2010);
SIT(lose a battle, army001, event001);
GRP(army001);
IDC(name, army001, "Swiss");
IDC(date, event001, 13 Sep. 1515); modification of the clue These new items of information are housed in the segment 2 and fully forward the situatron event001 into the segment 2.

The breakdown of the memory into time segments thus makes it possible to conserve a "historical" image of each situation which may be represented, in our example of Marignan, in the following manner:
Segment 2:
SIT(lose a battle, army001, event001)
GRP(army001)
IDC(name, army001, "Swiss")
EVT (event001)
IDC(title, event001, "Battle of Marignan")
IDC(date, event001, 13 Sep. 1515)
Segment 4:
SIT(win a victory, king001, event001, place001)
HUM(king001)
IDC(name, king001, "François 1st")
SPA(place001)
IDC(country, place001, "Italy")

the second dimension is an idiosyncratic dimension. "Idiosyncratic" signifies "which constitutes the specificity, the singularity of someone or something". This dimension is in fact linked to the level of incidence, which encompasses in a general manner any criterion making a datum noteworthy, and in particular the singularity or the relative specificity of the datum. To return to our example of mice, an "orange mouse" will be a situatron with a high singularity in a universe where generally white mice are observed. This dimension extends along the Y axis in FIG. 2.

the third dimension is a conceptual dimension. It associates with the data one or more attributes making it possible to hierarchize the data according to levels of abstraction. Each level of abstraction defines a segment of the conceptual dimension, which is called an abstraction plane 100. These planes 100 extend along the Z axis and represent more and more evolved forms of situation knowledge as the upper layers are reached. Advantageously, the duality of the memory is implemented in the form of an alternation of planes of situations 100a and planes of connexity 100b: the set of even levels 100a is a partition of the space of situations, and the set of uneven levels 100b is a partition of the space of connexity.

The level 0 contains situations, situatrons and groups of situations and situatrons. Example: 2 black mice mouse001 and mouse002; 2 computers comp001 and comp002; 2 users user001 and user002; 2 situations "connected"; 2 situations "use";

The level 1 contains connexity relations among the situations and the situatrons of the first level. Continuing the preceding example, it will involve, for the first series of situations and situatrons, connexity links among: Mouse001 and comp001; Comp001 and user001; User001 and mouse001 (the latter link being induced);

The level 2 contains hypersituations, hypersituatrons and groups of hypersituations and hypersituatrons induced by an analysis of the connexities of the second level. From the connexity link of the lower level, it is possible to induce a hypersituatron MOUSE or COMPUTER or USER, as well as hypersituations CONNECTED and USE. At the level of hypersituatrons it is thus possible, for example, to CONNECT the MOUSE to the computer and USE the COMPUTER by the USER;

The level 3 the hyperconnexity that corresponds to the connexity links established between the hypersituatrons and the hypersituations of level 2;

And so on . . . .

Advantageously, the memory 10 is connected to a mass storage space 16 in which all or part of said memory may be saved. For example, in the preferred embodiment in which the memory is organized according to three dimensions in the form of a cube assembly, it is memory cubes that will be saved. This interaction with a mass storage space is advantageously implemented in the form of swapping by those skilled in the art. This makes it possible to work both on several contexts by switching from one to the other, or instead to work with situational memories of larger size than that of the addressing capacity of the processor.

Integrator

The device 1 comprises means 11 for integrating one or more incoming information streams. These means 11 of integration (or situational integrator) recognize in the information stream(s) situations becoming closer to situations already present in the memory 10. New situations and new situatrons are produced from the data of the streams. These data are structured and their attributes defined according to the organization of the memory 10.

To take an example, the situational integrator could be a module that reads lists of computer mouse sales presented in the form of XML streams on the input gates. It interprets the streams and separates the items of information to:

Place the situations and the situatrons in the memory 10;
Place the instructions in the processing concentrator 13.

In the case of an embodiment in which the memory is divided into several dimensions and segments, the integrator loads advantageously the situations and the situatrons in:

The temporality segment containing the current date ("Present");
The idiosyncratic segment of highest level of incidence;
The segment of abstraction determined according to the set up of the integrator.

Inference Engine

Thanks to the integration means 11, the memory 10 contains data. An inference engine 14 implements processings that are going to apply to all or part of the memory 10. These processings are loaded from a library 15 and are called inference rules 141. At each launch of rules, a sequence including at least one segment of memory is going to be scanned, and the associated memory regenerated. Regenerate is here taken to mean create, delete or modify at least one datum and/or at least one attribute value and/or at least one connexity link in at least one space of the memory. In particular, in the preferred embodiment described here, a processing that can be carried out by the inference engine 14 on a level of abstraction 100 may apply to levels of same parity.

Nevertheless any computer system has a finite capacity, and the recursive application of processings would rapidly take an exponential time. This is why each processing only concerns in general part of the memory 10. Segments are processed as a priority, then others according to the sequence described previously, before another processing no longer becomes priority (see "concentrator" below). The processings can moreover be executed in series as in parallel.

The inference rules 141 encompass all of the processings that it may be interesting to apply. The selection of these rules 141 depends on the effects sought, and may be judged by those skilled in the art as a function of the application field for which the architecture is implemented.

The following examples of possible rules 141 may be cited:

"Unification" consists in recognizing in a recent situatron an older situatron or in a situation an already known situation and to make the substitution and when appropriate the complement of information through merger of elements.

"Temporalisation" consists in sliding the situations and the situatrons concerned from one time segment to another.

"Reduction" consists in deleting clues of situatrons as they slide into past segments. This operation is based on the recorded use of clues.

"Trivialisation" consists in sliding situatrons and situations between the levels of importance. The sliding may be in both directions depending on whether the thing becomes trivial or that its importance is reinforced given the evolutions of the other situations.

"Aggregation" consists in gathering together several situatrons that no longer need to be distinguished into a single aggregate inheriting the principle properties of the situatrons and replacing them by the aggregate each time that this is possible.

"Prediction" consists in applying situational phenomena on observed situations in order to forecast forthcoming situations.

"Realization" consists in finding, in the present, situations meeting the forecasts made and bringing them closer.

"Plausabilisation" consists in preferring in the forecast situations those connected to past situations that have been realized.

In particular, in the case of an embodiment with alternate abstraction layers, a rule is used making it possible to induce a connexity level of abstraction $2k+1$ from a situation level of abstraction $2k$ and a rule making it possible to induce a hypersituation level of abstraction $2k+2$ from a connexity level of abstraction $2k+1$, in other words generating a higher level from the preceding.

For the first of these two rules, numerous possibilities exist, in particular: the new connexity links may be deduced according to rules of connexity declared in the library, induced from the observation and the generalization of connexities from the past, statistical according to the connexities distributed in the situational memory, probabilistic on Bayesian sub-sets, genetic by mutation of previous connexity circles, etc.

The second of these two rules consists more simply in a generalization of a group of situations and situatrons from a number of cases of connexities more or less important as a function of the level of importance.

Concentrator

Means 13 for allocating resources (or concentrator) manage the processing times between the different processings. To do this, they have available a priority rule according to which they activate or deactivate the inference rules 141. There must never be too many rules active at the same time, at the risk of exceeding the capacity of system.

The priority rule enables both a spatial hierarchy of the memory cubes 101 to be processed, and a time hierarchy of the rules 141 to be launched.

In one case as in the other, numerous parameters are taken into account. Advantageously, this breakdown takes place according to a criterion known as "essentiality". At any instant, the criterion of essentiality is calculated for a rule and the rule(s) are launched for which it is maximal if they are not yet activated. In the case of launch of a rule, the essentiality criterion on the memory cubes 101 is then calculated (to be processed by said rule), the sequence is generated by sorting the segments according to a decreasing essentiality, and the cubes are processed according to said sequence, it being interrupted in the case of deactivation of the rule.

Firstly, the essentiality of the memory cubes depends on predefined parameters inherent in the current rule. For example, the largest groups of situations will be preferred for rules aiming to establish connexity links. Moreover, advantageously, the most abstract memory cubes, the most recent, and the most singular will have the maximal essentiality, also by analogy with human reflection.

Then, the essentiality of the rules depends also on predefined parameters hierarchizing the rules, at equal context. But above all the essentiality of an inference rule 141 depends on the interval separating its activation occurrences. The longer the rule has been inactive, the greater its essentiality. This makes it possible to regularly carry out all sorts of processing.

In a preferential embodiment, the concentrator may be conceived as a pile of processings in which the most essential processings are situated at the top of the pile, the least essential at the bottom. The last processing arrived places itself at the end of the pile with the essentiality of the "present" segment.

In this mode, the concentrator scans according to a fixed frequency the entire pile and recalculates at each cycle the level of essentiality of the processings as a function of different parameters. The following parameters may for example be retained:

D: their waiting time. At each passage of the concentrator, D is incremented by a fixed quantity, for example 0.25;

T: the temporality of the associated memory cube. T takes a value representing the order of the temporality segment (from 1 to N, 1 characterizing the oldest segment);

I: the incidence of the associated memory cube. I takes a value representing the order of the incidence segment (from 1 to N, 1 characterizing the segment of least incidence);

A: the level of abstraction of the associated memory cube. A takes a value representing the order of the level of abstraction (from 1 to N, 1 characterizing the lowest level).

The essentiality E may then advantageously be represented by the following formula: $E=D+I+T+A$, or by any other formula of the type $E=f(D, I, T, A)$, particularly $E=d*D+i*I+t*T+a*A$ with (d, t, a) suitable coefficients.

The invention is nevertheless not limited either to a specific mode of calculating the essentiality, or to a predefined list of parameters.

Moreover, in the embodiment described, the processings may be characterized in order to control their mode of execution by the concentrator. Thus, each processing may for example be defined as unique or as permanent: a unique processing will exit the pile when it is realized whereas a permanent processing realized is replaced at the end of the pile and will be renewed. It may also be defined as active or as delayed: an active processing is taken on by the concentrator whereas a delayed processing waits in the pile awaiting its turn, the concentrator ignoring the delayed processings that have not come to an end. A permanent delayed processing may also be defined as having to be launched at a fixed date or according to a fixed frequency.

Extractor

A means 12 for extracting data (or extractor) make it possible to deliver an information stream thanks to which it will be possible to collect the results of numerous processing cycles carried out by the inference engine 14 on the memory 10. The means 12 identify data within the memory 10 according to different principles, not mutually exclusive. Thus the data targeted may be defined according to attribute values, or their belonging to a closely related group. On the other hand, it is their place in the memory that may be important, in this case the means 12 of extraction listen to several memory cubes. The extraction criteria may also be predefined arbitrarily by programming.

Advantageously, the information stream composed by the means 12 for extracting data is composed:

on the one hand of alerts: in this case, the means of extraction are able to select singular situations (new, abnormal) or situations having varied (situational phenomena);

and on the other hand case scenarios: the latter correspond to projected predicted situations and present in the memory cubes of plausible segments to come.

Physical Processor for Situational Analysis

The invention proposes according to a second aspect an information processing system. It involves a physical implementation of the architecture of the processing device 1 according to the first aspect of the invention. This information processing system is for example in the form of a co-processor.

The processing system comprises a processing unit, dedicated to the execution of rules 141 of inference. Advantageously, it is a multi-core co-processor. In fact, as has been seen, situational analysis enables the parallel processing of data, with the possibility of activating several rules simultaneously. Alternatively, this processing unit can implement a neuronal network around several elementary processing "cells". Such a network is particularly adapted to learning.

The processing system also comprises a memory unit, for example of random access memory (RAM) type. It is there that will be hosted the memory 10 of the situational architecture. Optionally, the system also includes a mass memory 16, such as a hard disc, to be able to carry out the swapping of data described previously.

Two interfaces are also necessary, one for the incoming information stream(s) intended for integration means 11, and the other for the outgoing information stream(s) supplied by the means 12 for extracting data.

Apart from this physical implementation, a co-processor for situational analysis may be purely logical, and be emulated as a program of a work station. In this latter case, the invention relates to a computer program product including program code instructions which, when they are executed, implement the processor architecture for situational analysis described previously.

Environment of the Processor for Situational Analysis

Figure 3:
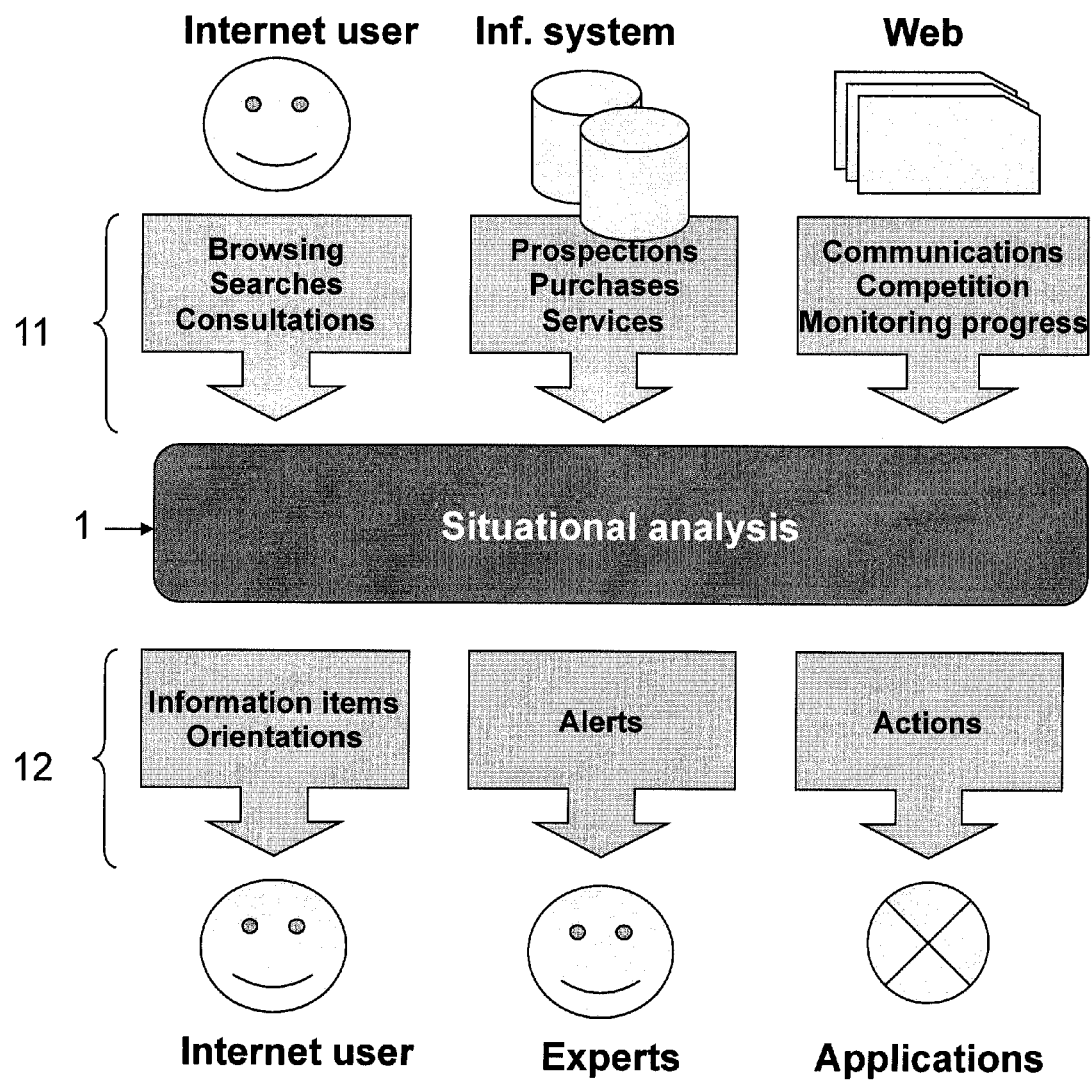
FIG. 3 is a diagram showing how the device according to the invention may be integrated in a computer environment.

Whether physical or logical, the architecture of the device 1 for data-processing by situational analysis is easily incorporated in other architectures to produce efficient tools, as shown in FIG. 3. The means 11 for integrating information may be adapted quite particularly to the internet through which the data to be recovered are abundant. For example, the data may be generated by the course of one or more clients in a store. It may be interesting to understand the situations in which they place themselves during a purchase, or precisely a non-purchase.

The situational analysis results, obtained via the means 12 for extracting data, may be transmitted to the client himself, for example to help him to make his choice: if he is looking for a computer mouse, the analysis of situations of previous purchasers may enable him to determine a product that will suit him. The data may also obviously be transmitted and exploited by experts, in particular alerts on abnormal situations.

The applications of situational analysis turn out nevertheless to be extremely vast, particularly in the world of the internet.

The invention claimed is:

1. A data-processing device (1) comprising:
a memory (10) organized into two spaces, a first space containing attributes describing the stored data, and a second space containing connexity links among the stored data, and, according to one or more dimensions respectively associated with the attributes and divided into one or more hierarchized segments, the data being inputted by creating, deleting or modifying the values of the attributes characterizing said segments;

an integrator (11) for integrating one or more incoming information streams, which analyzes said streams to determine the data constituting said streams and to structure said data and the attributes thereof according to the organization of said memory (10);

an inference engine (14) implementing, in parallel or in series, inference rules (141) grouped together in libraries (15), said rules (141) being programmed to regenerate a sequence including at least one segment of the memory, by creating, deleting or modifying at least one of a datum, an attribute value, and a connexity link during the implementation thereof in the at least one space of the memory, a resources allocator (13), which activates or deactivates the inference rules (141) on the basis of a priority rule, a data extractor (12), which identifies data by programming and by at least one of a selected attribute value and a selected connexity link, located in one or more selected segments of the memory (10), and providing identified data in one or more outgoing information streams.

2. The device according to claim 1, wherein the memory (10) is organized in at least three dimensions, of which at least one time dimension associating with the data one or more attributes making it possible to date the memorization of the data, an idiosyncratic dimension associating with the data one or more attributes making it possible to determine the relative specificity of the data, a conceptual dimension associating with the data one or more attributes making it possible to hierarchize the data according to levels of abstraction (100).

3. The device according to claim 2, wherein the first space of the memory containing attributes of the data is constituted of even levels (100*a*) identified as situation levels, and the second space of the memory containing relations between data is constituted of uneven levels (100*b*) identified as connexity levels.

4. The device according to claim 1, wherein at least one inference rule implemented by the inference engine infers for a positive integer k a connexity level of abstraction 2k+1 from at least one of a situation level of abstraction 2k and a hyper-situation level of abstraction 2k+2 from a connexity level of abstraction 2k+1.

5. The device according to claim 1, wherein the priority rule implemented by the resource allocator (13) is a function of
the hierarchy of the memory segments to be regenerated, predefined parameters of inference rules (141), and
the interval separating the activation occurrences of the inference rules (141).

6. The device according to claim 1, wherein the memory is connected to a mass storage space in which segments may be saved.

7. The device according to claim 1, wherein the data extractor (12) selects singular situations, situations having varied, and plausible projected situations.

8. An information-processing system including at least one processing unit, at least one memory unit, a first interface with at least one incoming information stream and a second interface with at least one outgoing information stream, which implements the architecture of the processing unit according to claim 1.

9. The system according to claim 8, wherein said processing unit comprises at least one multi-core processor.

10. The system according to claim 8, wherein said processing unit implements a neuronal network structure.

* * * * *